Patented Jan. 24, 1950

2,495,233

UNITED STATES PATENT OFFICE 2,495,233

METHOD OF TREATING CELLULOSIC MATERIALS WITH TRIMETHYLOLPHENOL

Nicolas Drisch and René Fays, Paris, France, assignors to Comptoir des Textiles Artificiels, a corporation of France No Drawing. Application February 23, 1946, Serial No. 649,779. In France May 26, 1943

Section 1, Public Law 690, August 8, 1946
Patent expires May 26, 1963

6 Claims. (Cl. 8—115.6)

This invention relates to a method of preparing shaped structures, and more particularly to a method of treating shaped structures to improve the physical characteristics thereof.

Copending application Serial No. 649,777, filed on even date herewith, and entitled "Cellulose derivatives and process of preparing same," discloses a new cellulose derivative (polyaryl methane methylene ether of cellulose) termed "resyl cellulose" and the method of making the same. According to the disclosure of said application, the resyl cellulose is obtained, in general, by reacting cellulosic material containing free hydroxyl groups with a resiniferous bi- or poly-functional compound capable of forming resiniform bridge linkages between the cellulose chains by internal polymerization under the influence of heat, and more particularly bi- or polymethyloloxyaryls having the following general formula:

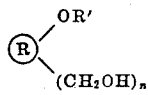

in which R is any cyclic or polycyclic aryl group, R' is an alkyl, aryl, acyl group or hydrogen, and $n$ is at least 2. The radical R may comprise, for example, two or more phenyl groups combined by direct saturation of their valences or by an oxygen, carbonyl, amine, hydrocarbon, etc. bridge, or by polycyclic groups themselves combined as explained. The reaction is effected by a thermal treatment, preferably in the presence of an acid catalyst.

Copending application Serial No. 649,778, filed on even date herewith, and entitled "Shaped synthetic products and method of making same," discloses a process of producing shaped articles from a new cellulose derivative, the cellulose derivative being obtained by reacting cellulosic materials containing free hydroxyl groups with resiniferous bi- or poly-functional reagents capable of forming the resiniform bridge linkages by etherification of the free hydroxyl groups of the cellulosic material, and, at the same time, producing an internal condensation of the reagent, the reagent being a bi- or polymethyloloxyaryl of the type above described and which has been (partially) condensed to a low degree. According to one embodiment of the invention disclosed in said application, products of a low degree of condensation, soluble in dilute caustic soda and derived from substances possessing essentially the composition of polymethylolphenol, are incorporated in a viscose spinning solution, which is spun into a coagulating and regenerating bath. The regenerated cellulose yarn, after being subjected to the necessary or desired liquid treatments, is subjected to a thermal treatment, preferably also in the presence of an acid.

Applicants have found that by treating preformed shaped structures of a cellulosic material containing free hydroxyl groups with the resiniferous bi- or poly-functional compounds disclosed in said application Serial No. 649,777, shaped structures will be obtained having improved physical characteristics when quantities of the reagent are used in amounts not in excess of 10% by weight based on the cellulosic material.

An object of this invention is to provide a new and improved method of improving the physical properties of preformed shaped structures formed of cellulosic materials containing free hydroxyl groups.

Another object of this invention is to provide a new and improved method of improving the physical properties of preformed shaped structures formed of regenerated cellulose.

A specific object of this invention is to provide a new and improved method of improving the physical properties of artificial yarn.

Other and additional objects will become apparent hereinafter.

The above objects are accomplished, in general, by impregnating the shaped structure with not more than 10% by weight, based on the weight of the structure, of a resiniferous bi- or poly-functional compound which is capable of forming resiniform bridge linkages between the cellulose chains by internal polymerization under the influence of heat, and subjecting the impregnated structure to a thermal treatment, preferably in the presence of a catalyst, to produce the resiniform bridge linkages between the cellulose chains.

The following specific examples are given to illustrate certain specific embodiments of the invention, it being understood that the invention is not restricted thereto, the proportions therein set forth being by weight unless otherwise specified:

Example 1

A skein of (viscose) rayon (metric number 30 and 40 strands) was immersed in an aqueous solution containing 2% of trimethylolphenol, and to which solution 2 grs. of tartaric acid per liter were added. After immersion for 10 minutes, the skein was removed from the bath and the excess impregnating bath removed. The skein was then dried in a drying oven maintained at a temperature of from 90° C. to 100° C. When the skein was dried, the temperature was gradually increased to 120° C., which temperature was maintained for 1 hour.

The skein, prior to treatment, exhibited a swelling of 95% and a kilometric wet strength of 6.5. After treatment, the skein had a swelling of 38% and a kilometric wet strength of 9.

Example 2

A thick bundle of filaments of regenerated cellulose was washed under the usual conditions in a machine also provided with desulfuring and bleaching baths. After leaving the last treating bath, the bundle was passed into an aqueous bath containing 5 grs. per liter of a sulfated fatty alcohol, and to which bath 1.5% of trimethylolphenol and 1 gr. per liter of acetic acid had been added. Upon leaving this bath, the bundle was calendered to remove excess liquid, and then was passed onto a series of rollers heated to 130° C. in such a manner that the time of contact in its last stage was about 6 minutes. On leaving the machine, the bundle was cut into staple 60 cm. long and the fiber was opened up by passage through an opening.

The resulting fiber had a swelling of 40% and was capable of being worked on cards and spinning frames actually used in the cotton industry. These carding and spinning operations, due to the slight swelling of the fiber and its slight sensitivity to hygrometric variations, could be performed more easily even when such operations were carried out in rooms which were not conditioned.

Example 3

A drapery material of pure staple fiber was treated by passage into and through an aqueous bath containing 4% of trimethylolphenol and 2 grs. per liter of lactic acid. Upon emersion from the bath, the material was passed between two pressure rollers to remove excess bath liquid and thence successively into a chamber maintained at a temperature of 90° C. and therefrom immediately to a drum heated to 130° C. in such a manner that the contact period on the drum was 10 minutes.

The product obtained had a swelling of 32% and was absolutely non-shrinking.

Example 4

The material prepared in Example 3 was removed after its passage through the chamber maintained at 90° C. At that time, the material had a swelling of 55%. The material was kept for an appreciable period of time. Subsequently, it was dyed under normal conditions, for example, with Oxydiazol Blue NB (sky blue) which is a benzidine dye. After dyeing, the material was dried at 135° C. for 10 minutes on a drum. The finished material had a swelling of 32% and exhibited the same characteristics as that of the product obtained by the process of Example 3.

In the preceding specific examples, the degree of swelling is defined in terms of percentage. Herein, swelling is expressed as percentage of water retained by the material after immersion in water and centrifuging for 10 minutes at 3,000 revolutions in a centrifuge 25 cm. in diameter.

The trimethylolphenol utilized in the examples is prepared in accordance with the method of Manasse and Lederer (Berichte der deutschen chemischen Gesellschaft, 1894, vol. 27, p. 2409), wherein phenol is condensed with formaldehyde, in the form of Formol, in the proportion of 3 mols of formaldehyde per mol of phenol, in the presence of an alkaline medium, such as caustic soda, lime, organic bases, etc., at moderate temperatures, for example not exceeding 65° C., the reaction being completed in about 2½ hours. At ordinary temperature (20° C.), the reaction will take about 48 hours, the end being marked by complete absorption of the Formol. The alkali is then carefully neutralized. During the reaction, precautions are taken to prevent the formation of resinous products. The resulting product is a polymethylolphenol consisting essentially of trimethylolphenol, as explained in co-pending application Serial No. 649,777, above-identified.

When a different phenolic derivative is employed as a raw material, the poly-alcohol phenol is prepared in a similar manner to that previously described, except that the quantity of Formol is determined by calculation of the maximum number of methylol radicals which can be fixed to the nucleus of the phenolic derivative used.

The polymethylolphenols are the simplest of the compounds which have proven to be the most suitable reagent for use in the process. The invention, however, is not restricted to polymethylolphenols. In general, any bi- or poly-functional resiniferous compound, and more particularly bi-or polymethyloloxyaryls, which in the presence of heat and preferably in the presence of an acid catalyst form resiniform bridge linkages by etherification of the hydroxy groups of the cellulosic material and internal condensation and having the following general formula, can be used:

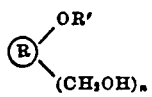

in which R is any aryl group, either cyclic or polycyclic, R' is an alkyl, aryl, acyl group or hydrogen, and $n$ is at least 2. The radical R may comprise, for example, two or more phenyl groups combined by direct saturation of their valences or by means of an oxygen, carbonyl, amine, hydrocarbon, etc. bridge. The radical R may also comprise polycyclic groups themselves united as above explained.

The reaction takes place between the extremely active hydroxyl groups of the cellulose chains and the methylol groups, the latter also reacting with each other to yield a poly-condensed nucleus. The reaction yields a resiniform bridge linkage between cellulose chains comprising a complex of a large molecule nucleus bound to neighboring cellulose chains by several methylene groups.

Though as shown in the examples, the shaped regenerated cellulose structure is preferably impregnated with the reagent by immersion in an aqueous solution of the reagent, the invention is not restricted to aqueous baths. Baths constituted by solutions of the reagent in organic solvents can also be used and are included within the scope of this invention. Impregating baths in which an organic solvent is utilized may also be advantageous in applying the process of the invention to manufactured articles, such as fabrics, clothing, etc., in order to avoid deformation by water before fixation of the reagent.

The concentration of the reagent in the impregnating bath can vary within limits, and the invention is not restricted to any specific concentration. In general, the concentration of the reagent in the bath is dependent on the time of immersion of the shaped article therein. In general, the quantity of the reagent, and particularly trimethylolphenol, incorporated into the shaped regenerated cellulose structure does not exceed 10% by weight of the cellulosic material. Even when relatively small quantities of the reagent, such as for example of the order of 1% based on the cellulosic material, are employed in the process, extremely clear and practical results are obtained.

The speed of the reaction depends on the temperature and the nature of the catalyst employed. In general, the higher the temperature and the greater acidity of the catalyst, the faster the reaction. However, operating conditions must be selected so that the cellulose chains do not undergo any appreciable degradation by the action of the catalyst, and the duration of the reaction is in accordance with the requirements of industrial operation.

The temperature of the thermal treatment, in turn, depends on its duration and the nature of the catalyst employed. In general, the temperature varies inversely with duration and activity of the catalyst and is usually from 80° C. to 130° C.

A remarkable feature of the invention is that the maximum characteristic properties which are attained by this invention are not imparted to treated cellulosic material by moderate heating. However, as shown in Example 4, a fairly considerable decrease in swelling is obtained, clearly indicating fixation of the phenol alcohol on the cellulose. It is in this stage that other treatments of textile materials, such as dyeing, sizing, etc., may be carried out, the necessary thermal treatment for completion of the reaction being carried out afterwards. Products obtained in this manner have the same properties as those obtained by direct and complete application of the thermal treatment.

As catalysts, acids, the dissociation constant of which is preferably less than or about $10^{-3}$, are used. Organic acids, such as lactic or acetic acids or even citric or tartaric acids, can be used. Likewise, mineral acids, such as phosphoric acid, may be used as the catalyst.

In general, the quantity of acid incorporated in the structure is such that the pH thereof when subjected to the thermal treatment should be less than 7, and preferably of the order of 5.5. It is, of course, to be understood that the thermal treatment can be carried out at a lower pH, using certain precautions.

In the preferred embodiments as shown by the specific examples, the catalyst is one of the components of the impregnating bath and, accordingly, is simultaneously incorporated into the shaped structure with the reagent. However, the invention is not restricted to such mode of incorporation of the catalyst. The catalyst can be incorporated into the shaped structure by a separate operation. In such case, the catalyst will be incorporated prior to the thermal treatment and preferably after the incorporation of the reagent.

Prior to the thermal treatment, the shaped structures, and particularly yarns, can be oiled or softened. Lubricating agents, such as sulfonated alcohols or polyamines, increase the effect of the reaction and seem to participate in the condensation or polymerization reaction. In the case of films, plasticizers, and particularly the poly-alcohols used therein, they seem to participate in the reaction while preserving their inherent softening characteristics.

For convenience, in the examples the process has been described in connection with filaments and yarns formed of regenerated cellulose and fabrics formed thereof. Though such materials are preferred, it is to be understood that the invention is not restricted thereto. The process is equally applicable not only to regenerated cellulose rayon in the form of yarn and textiles (fabrics), but also to other regenerated cellulose shaped structures, bristles, foils, fibers, tubing, thin pellicles, caps, bands, etc. The regenerated cellulose shaped structures can be obtained by extruding (casting or spinning) viscose solutions or any solution of a cellulosic material in which the cellulose is regenerated into the desired shape and form. The invention is also not limited to shaped structures of regenerated cellulose, but, in general, can be applied to the treatment of shaped structures, particularly yarn formed of natural cellulosic textile materials or of absorbent cellulosic materials, such as glycol- or oxyalkyl cellulose, lowly etherified cellulose ethers, cellulose carboxylic acids and the like, as well as fabric formed of such yarns.

The invention is also applicable to numerous shaped structures other than those aforementioned. For example, the process can be applied to artificial viscose sponges to render such sponges suitable for uses where prior to the treatment by the instant process they were unsuitable. Thus, for example, an artificial (viscose) sponge treated by the instant process can be used as a filter for gases and even liquids.

The invention gives optimum results in the case of cellulosic yarn, and particularly artificial cellulosic yarns having a pronounced absorbent nature and containing a relatively large number of free hydroxyl groups. Thus, a greater improvement in quality is obtained in the case of slightly drawn or greatly stretched synthetic yarns or those made from highly degraded cellulose, than in the case of yarn subjected to considerable drawing out during spinning.

Shaped cellulosic structures treated in accordance with the present invention are characterized by a substantial decrease in swelling (compared to that of the untreated material) without any degradation of the cellulosic material and of improved resistance to repeated washings carried out in neutral or alkaline media. By the instant invention, it is easy to produce cellulosic products, such as, for example, synthetic yarns and fabrics formed thereof, which swell less than 20%, which is lower than that of yarns of natural cellulose and fabrics formed therefrom.

The kilometric wet strength of the products of this invention is considerably improved as is also, more or less, the dry strength. An outstanding feature is in the improvement of the ratio of the wet to dry strengths. For example, in the case of regenerated cellulose yarn, the ratio of the kilometric wet strength to the kilometric dry strength is normally from 40% to 50%. With yarns treated in accordance with this invention, this ratio is at least 60% and, in many cases, higher. Moreover, the product of the invention is wetted with much more difficulty than the untreated material. Yarn treated in accordance with this invention also manifests low shrinkage on wetting. Regenerated cellulose yarn produced in accordance with this invention shrinks less than 2%, whereas the untreated regenerated cellulose yarn shrinks about 10% or more, particularly in alkaline media.

The products obtained by this invention exhibit a smaller permanent deformation. The modulus of elasticity is increased and hence fabrics treated by or formed of yarns treated by this invention present a smaller permanent deformation.

The process of the invention does not affect the dye affinity of the product for direct dyes, whereas, for example, stenosation causes a considerable and irregular decrease. The affinity of the product for acid or basic dyes is more or less improved.

When samples of yarn prepared in accordance with this invention are treated with 2% sulfuric acid for 1 hour at 90° C., there is a slight increase in swelling which indicates very high saponification. However, the yarn remains resistant to the action of cuprammonium solutions and retains its properties. On the other hand, if yarn prepared in accordance with this invention is treated with 5% caustic soda for 40 hours at room temperature, the kilometric wet strength remains practically constant, whereas comparison samples of the untreated yarn are completely disintegrated and no longer have any resistance.

The invention provides a method whereby the properties of shaped cellulosic structures, and particularly yarns, filaments, bristles, etc., are materially and substantially improved. For example, yarn treated in accordance with the instant invention, when compared with the untreated yarn, shows that the former has acquired a material decrease in swelling, an increased kilometric strength, especially wet strength, and will shrink slightly on wetting followed by drying without tension as when the yarn or fabric thereof is subjected to repeated washing with 5% soap solutions in the presence of sodium carbonate. The resiniferous reagent, and particularly the polymethylolphenols, need not be partially condensed as in the process described in the previously referred to application Serial No. 649,778, because there is no risk of loss of reagent as in the case of coprecipitation with the cellulosic material. Accordingly, smaller quantities of the reagents need be used in the instant process.

Since it is obvious that various changes and modifications may be made in the above description without departing from the nature or spirit thereof, this invention is not restricted thereto except as set forth in the appended claims.

We claim:

1. A method which comprises impregnating a preformed cellulosic structure containing free hydroxyl groups with not in excess of ten percent by weight of the cellulosic material of said structure of a non-resinous polymethylolphenol reagent consisting essentially of a trimethylolphenol and capable of forming resiniform bridge linkages between cellulose chains, from a solution of said polymethylolphenol reagent, and subjecting the impregnated shaped structure to a thermal treatment to thereby produce a resinification of the bridge linkages.

2. A method as claimed in claim 1, wherein the thermal treatment is rendered in the presence of an acid catalyst.

3. A method as claimed in claim 1, wherein the impregnated shaped structure is at an acid pH in the neighborhood of 5.5 during the thermal treatment.

4. A method as claimed in claim 1 wherein the polymethylolphenol is trimethylolphenol itself.

5. A method as claimed in claim 4 wherein the thermal treatment is rendered in the presence of an acid catalyst.

6. A method as claimed in claim 4, wherein the impregnated shaped structure is at an acid pH in the neighborhood of 5.5 during the thermal treatment.

NICOLAS DRISCH.
RENÉ FAYS.

REFERENCES CITED

The following references are of record in the file of this patent:

UNITED STATES PATENTS

| Number | Name | Date |
|---|---|---|
| 1,734,516 | Foulds et al. | Nov. 5, 1929 |
| 2,054,444 | Pinten | Sept. 15, 1936 |
| 2,088,227 | Battye et al. | July 27, 1937 |
| 2,137,465 | Thackston | Nov. 22, 1938 |
| 2,158,494 | Corteen et al. | May 16, 1939 |
| 2,190,672 | Meharg | Feb. 20, 1940 |
| 2,288,695 | Fuller | July 7, 1942 |
| 2,338,983 | Thackston et al. | Jan. 11, 1944 |

FOREIGN PATENTS

| Number | Country | Date |
|---|---|---|
| | | Not accepted; Application date: |
| 484,691 | Great Britain | Aug. 4, 1936 |
| 480,171 | Great Britain | Feb. 15, 1938 |

OTHER REFERENCES

Graner: "Condensation of Phenols with Formaldehyde," I. and E. Chem., vol. 24, No. 4 (Apr. 1932) pages 442–447.